June 22, 1965
A. M. GORFIN
3,190,149
SPEED REDUCTION DRIVE MECHANISM
Filed Oct. 5, 1962
3 Sheets-Sheet 1
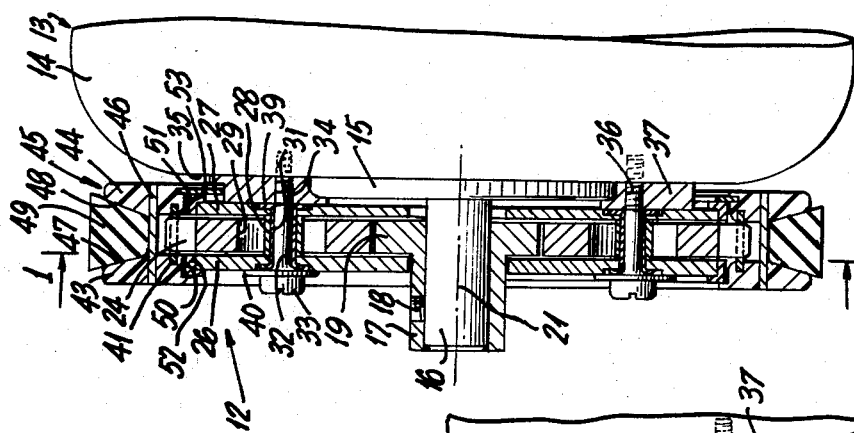
INVENTOR.
ALEX M. GORFIN
BY
*J. B. Felshin*
ATTORNEY.

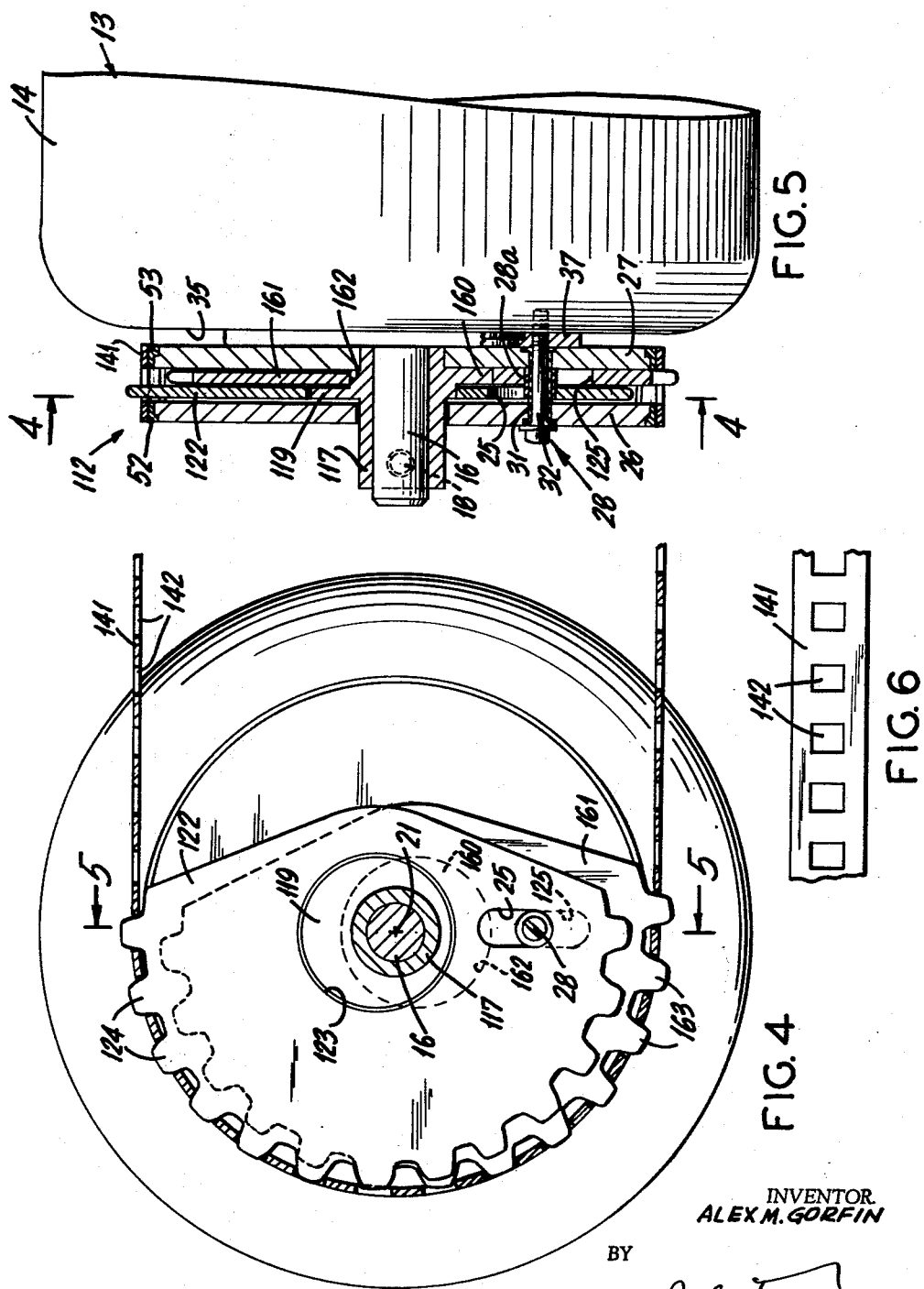

June 22, 1965  A. M. GORFIN  3,190,149
SPEED REDUCTION DRIVE MECHANISM
Filed Oct. 5, 1962  3 Sheets-Sheet 3
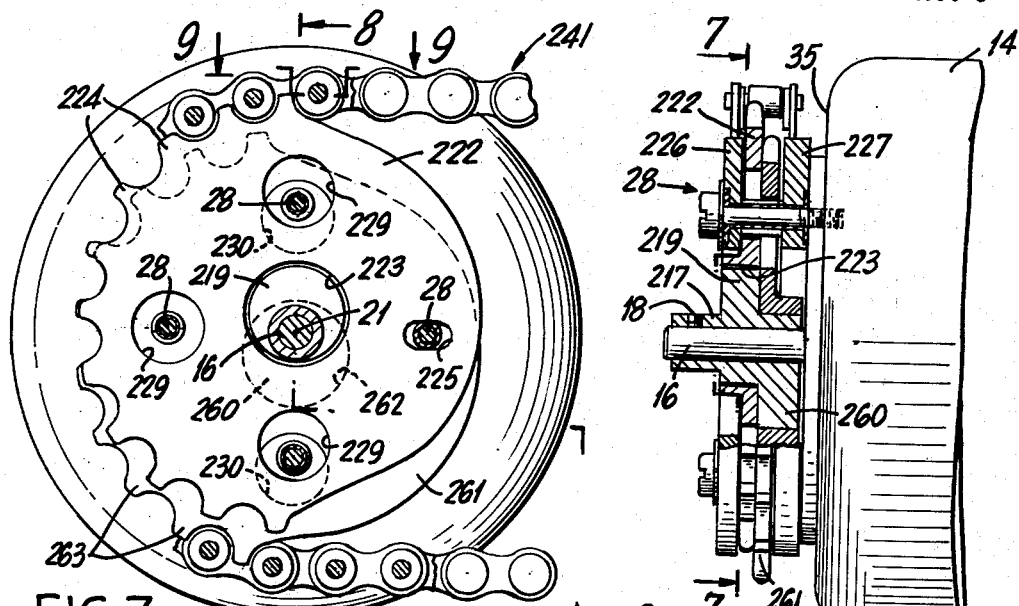
FIG.7
FIG.8
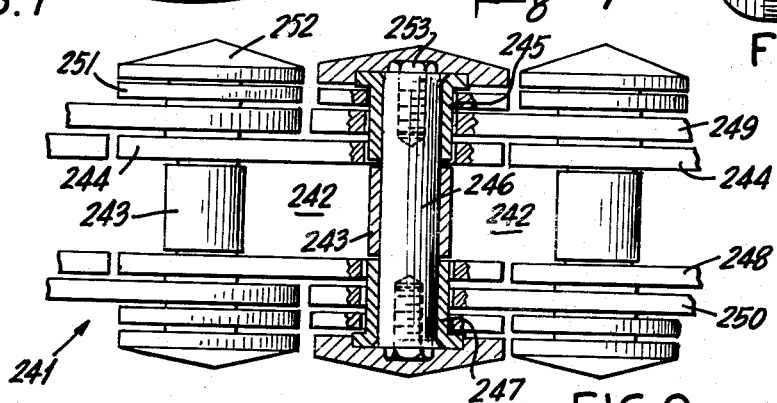
FIG.9
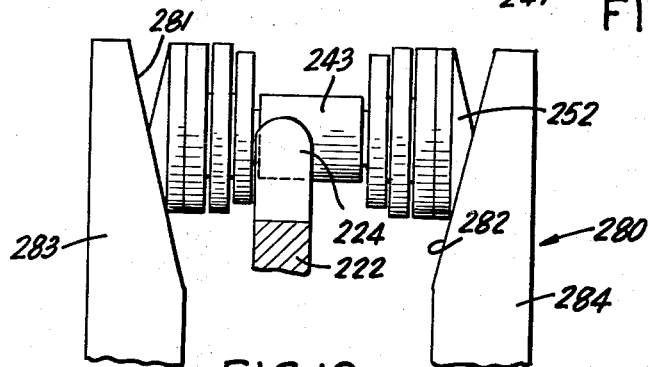
FIG.10
INVENTOR.
ALEX M. GORFIN
BY
J.B. Felshin
ATTORNEY.

United States Patent Office 3,190,149
Patented June 22, 1965

3,190,149
SPEED REDUCTION DRIVE MECHANISM
Alex M. Gorfin, 490 West End Ave., New York, N.Y.
Filed Oct. 5, 1962, Ser. No. 228,556
16 Claims. (Cl. 74—805)

This invention relates to a speed reduction drive mechanism for converting power at high speed and relatively low torque to low speed and correspondingly higher torque; and more particularly to a reduction mechanism for use where a high transmission ratio is required.

In the latter event, that is, where the desired speed of the power output shaft is very much lower than the speed of the power input shaft (usually the shaft of an electric motor) the speed reduction transmissions of the prior art involved several important disadvantages. If the gearing comprised conventional spur or bevel gears, the high transmission ratio required an extensive gear chain with a large number of gears, thereby resulting in a device which was large, bulky and expensive. Use of a worm gear and pinion reduced the size of the transmission unit somewhat, but was inefficient and required replacement of the worm gear which wore out too frequently. The use of a belt or chain engaging a pulley or sprocket was limited to small transmission ratios up to about 8:1.

It is therefore a primary object of the present invention to provide a speed reduction drive mechanism having a high transmission ratio but which is nevertheless simple, compact and inexpensive.

This object is achieved by a novel arrangement wherein the rotation of the motor shaft is converted into a combined oscillatory and reciprocating translatory motion of a driving gear whereby the teeth of the gear will progressively enter into and out of engagement with a series of spaced openings in a continuous curvilinear driven element extending around the gear. This progressive interengagement causes the driven element to be displaced a distance of one driving gear tooth space for each rotation of the motor shaft.

Similar arrangements have been known in the prior art where the driven element was in the form of an internal gear surrounding the driving gear. This arrangement could not provide as high a transmission ratio as the present invention for the following reasons. The transmission ratio may be calculated as:

$$\text{Ratio} = \frac{\text{Number of teeth on outer gear}}{\text{Difference between number of teeth on outer and inner gears}}$$

When using standard tooth forms, the prior art arrangements wherein the outer driven element was an internal gear required for proper meshing that this internal gear have no fewer than three more teeth than the inner driving gear. By using special short tooth forms, it was possible to construct the outer internal driven gear with only two more teeth, thereby increasing the transmission ratio by fifty percent.

However, by the novel construction of the present invention, the driven element may have in effect only one more tooth than the driving gear, thereby providing a transmission ratio two or three times as large as those of said prior art arrangements.

In one form of the invention the continuous curvilinear driven element is in the form of a cylindrical wall surrounding the driving gear and having a series of openings therethrough for receiving the gear teeth. In another embodiment of the invention the driven element is in the form of a flexible tape or belt having spaced openings therein for receivably engaging the gear teeth. In a third modification of the invention there is disclosed a driven element in the form of a flexible chain.

Other advantages of the invention are inherent in the structure disclosed or will become apparent to those skilled in the art as the description proceeds in connection with the accompanying drawings wherein:

FIG. 1 is a vertical sectional view taken substantially on line 1—1 of FIG. 2 and shows one form of the invention;

FIG. 2 is a vertical sectional view taken substantially on line 2—2 of FIG. 1;

FIG. 3 is a horizontal sectional view taken substantially on line 3—3 of FIG. 1;

FIG. 4 is a vertical sectional view taken on line 4—4 of FIG. 5 and shows a modified form of the invention wherein the driven element is in the form of a continuous tape;

FIG. 5 is a vertical sectional view taken substantially on the line 5—5 of FIG. 4;

FIG. 6 is a plan view of a portion of the tape;

FIG. 7 is a vertical sectional view taken on line 7—7 of FIG. 8 and shows still another modified form of the invention wherein the driven element is in the form of a chain;

FIG. 8 is a vertical sectional view taken substantially on the line 8—8 of FIG. 7;

FIG. 9 is a horizontal sectional view taken substantially on the line 9—9 of FIG. 7 and shows the construction of the chain; and FIG. 10 is an enlarged view showing the engagement of the chain with the V-groove of a pulley.

The embodiment of the invention disclosed in FIGS. 1 to 3 inclusive will first be described. These figures disclose a speed reduction drive mechanism indicated generally by the reference numeral 12 and shown mounted to one end of a motor 13. The latter comprises a housing 14, having at one end an enlarged circular boss 15 provided with a suitable opening through which the motor shaft 16 outwardly projects.

Speed reduction drive mechanism 12 comprises a cylindrical sleeve member 17 mounted on motor shaft 16 and secured fixedly thereto by a set screw 18. Formed integral with the inner end of member 17 is a circular eccentric disk 19 having a center 20 displaced eccentrically from the axis 21 of motor shaft 16.

A driving gear 22 is provided with a central circular opening 23 which engageably receives eccentric disk 19. Extending entirely around the periphery of gear 22 are a series of teeth 24. Gear 22 is further provided with a somewhat elongated slot 25 which extends entirely therethrough and also radially with respect to the axis 20 of gear 22.

Gear 22 and eccentric disk 19 are located within a stationary support or housing comprising a pair of fixed spaced housing plates 26, 27 which are held in spaced apart relation by four spacer sleeves 28 spaced at 90° intervals. Three of the spacer sleeves 28 extend through circular holes 29 formed through the web portion 30 of gear 22. The fourth sleeve 28 extends through slot 25. A bushing 31 extends through each of the sleeves 28 and receives a bolt 32 having at its front end a slotted head 33 and at its rear end a threaded portion 34 which is in threaded engagement within a suitable screw hole (not shown) formed in the end face 35 of motor housing 14.

Threaded portions 34 extend through clearance openings 36 provided in a circular spacer plate 37 which abuts against end face 35 of motor housing 14 so as to maintain rear cover plate 27 in spaced relation with respect to housing face 35. Each of the bushings 31 is provided at its opposite ends with laterally extending flanges 39 and a washer 40 extends between the forward flanges 39 and slotted head 33 of bolt 32.

The bolt 32, bushing 31, and spacer sleeve 28 which project through elongated slot 25 formed in gear 22 together in effect constitute a pin extending through said slot 25 so as to limit the movement of gear 22 in a manner to be described below. The three holes 29 serve merely to provide clearance so as to permit gear 22 to move as required without obstruction from the other three assemblies consisting of the bolt 32, bushing 31 and spacer sleeve 28 which serve merely as means for maintaining housing plates 26, 27 in fixed assembled relation to the end face 35 of motor housing 14.

Extending around gear 22 and adapted to be drivingly engaged thereby is a cylindrical driven element 41 comprising a thin cylindrical wall having a series of openings 42 spaced entirely therearound for engageably receiving the teeth 24 of gear 22. Cylindrical drive element 41 is preferably of metal and has its opposite edges securely embedded in the respective halves 43, 44 of a pulley indicated generally at 45. The pulley halves 43, 44 are held together by a tubular metal element 46 and are provided with sloping wall portions 47, 48 respectively for engageably receiving a V-shaped belt 49. The inner peripheries of pulley halves 43, 44 are provided with bearing surfaces 50, 51 which slide upon stationary cylindrical bearing elements 52, 53 fixedly mounted to the outer edges of plates 26, 27 respectively.

Speed reduction drive mechanism 12 operates in the following manner. Energization of electric motor 13 causes rotation of motor shaft 16 along with sleeve member 17 secured thereto. Eccentric disk 19 is thus rotated about shaft axis 21 and thereby drives gear 22. The latter, due to the engagement of its slot 25 with the fixed pin structure consisting of elements 28, 31, 32 undergoes a combined oscillating and reciprocating motion in response to rotation of eccentric disk 19 about shaft axis 21. As gear 22 undergoes this motion, gear teeth 24 will progressively engage successive openings 42 in cylindrical driven element 41 so that the pitch diameter of gear 22 effectively rolls around the interior surface of driven element 41.

Because driven element 41 is in the form of a thin cylindrical wall, instead of an internal gear as in the prior art, the number of effective "teeth" (that is, spaces between openings) of element 41 may be as few as one more than the number of teeth on driving gear 22. In this event, for every rotation of motor shaft 16 cylindrical drive element 41 is advanced a disatnce of one tooth space by the action of gear 22 rolling in the manner aforesaid. The power is thus transmitted from motor shaft 16 through eccentric 19 to gear 22 which is turn transmits the power to cylindrical driven element 41 and hence to pulley 45 from where the power is taken off by drive belt 49.

Referring now to FIGS. 4 to 6 inclusive, there is shown a modified form 112 of the invention wherein those parts which are similar to corresponding parts of the modification of FIGS. 1 to 3 are given the same reference numerals. The modified speed reduction driven mechanism indicated generally by the reference numeral 112 comprises a sleeve member 117 secured by a set screw 18 to a motor shaft 16 projecting from a housing 14 of an electric motor 13. Sleeve member 117, like its counterpart indicated at 17 in FIGS. 1 to 3, is provided with an eccentric disk 119 similar to disk 19 described above but approximately one-half as thick. A second eccentric disc 160 is formed integral with sleeve 117 and has its center displaced 180° from the center of disk 119. That is, the eccentric throw of disc 119 is in the opposite direction to that of disk 160, for a purpose to become apparent.

A first gear 122 similar to gear 22 but preferably half as thin is provided with a circular opening 123 receiving disk 119 which drives gear 122, and a second gear 161 is similarly provided with an opening 162 receiving the second eccentric disk 160 so as to be driven by the latter. It will be noted that each of gears 122, 161 is provided with gear teeth at 124, 163 respectively only throughout an arcuate segment of 180°.

Each of gears 122, 163 is provided with an elongated radially extending slot as at 25, 125 respectively. A bolt 32 together with a bushing 31 and a spacer sleeve 28, as described above with respect to the modification of FIGS. 1 to 3, extend through slots 25, 125 and also through housing plates 26, 27 and mounting plate 37 to maintain said plates in fixed relation on the side face 35 of motor housing 14.

It will thus be seen that the engagement of slots 25, 125 with the pin assemblies 28, 31, 32 permits gears 122, 161 to simultaneously oscillate about the axis of bolt 32 and undergo reciprocal translatory movement in a radial direction as eccentrics 119, 160 are rotated about the axis 21 of shaft 16. Due to the fact that the eccentricity or throw of eccentric 119 is 180° from that of eccentric 160, the motions of gears 122, 161 will be identical but displaced one-half cycle or 180° from each other.

Riding on the cylindrical bearings 52, 53 secured to the outer peripheries of housing plates 26, 27 respectively is a continuous drive tape 141 having therein a series of spaced openings 142 adapted to engageably receive the teeth 124, 163 of gears 122, 161. The combined oscillatory and reciprocally translatory motion of the gears 122, 161 will cause teeth 124, 163 thereof to progressively engage the openings 142 as the pitchlines of gears 122, 161 effectively roll along the inner surface of the semicircular arcuate portion of belt 141.

Due to the 180° phase displacement of eccentric 119 and gear 122 with respect to eccentric 160 and gear 161, it will be seen that for one-half the cycle of rotation of shaft 16 tape 141 is engaged by gear 122 whereas for the other half-cycle of rotation of shaft 16 tape 141 is engaged by the other gear 161, the two gears thus alternately driving tape 141 which in turn may be connected to a pulley (not shown) or sprocket gear (not shown) to receive the power transmitted by tape 141 from shaft 16 through gears 122, 161.

Referring now to FIGS. 7 to 10 inclusive there is shown still another modified form of the invention similar to the modification of FIGS. 4 to 6 described above except that a chain 241 is employed instead of the tape 141 of the previous modification.

More specifically, chain 241 is alternately engaged by gears 222, 261 which are simultaneously oscillated about the axis of pin assembly 28, 31, 32 and reciprocably translated in the radial direction whereby the teeth 224, 263 will progressively engage the spaces 242 between the roller sleeves 243 of chain 241. Gear 222 is provided with a central opening 223 which receives a circular eccentric disk 219 formed integral with a sleeve 217 secured to motor shaft 16 by a set screw 18. Also formed integral with sleeve 217 is a second circular eccentric disk 260 received within a circular opening 262 formed in gear 261. As noted above with respect to the previous modification, eccentric disks 219, 260 are displaced 180° or one-half cycle of rotation apart so that the respective motions of gears 222, 261 are 180° out of phase with each other.

Each of gears 222, 261 is provided with an elongated slot 225 extending radially with respect to the axis 21 of motor shaft 16. A pin assembly extends through both slot 225 and comprises a spacer sleeve 28, bushing 31 and bolt 32, as described above. Three other pin assemblies extend through suitable openings formed in housing plates 226, 227 to maintain the latter in assembled relation on the side face 35 of motor housing 14. Gear 222 is provided with circular clearance holes 229 through which said pin assemblies may project without obstructing the movement of gear 222, and the other gear 261 is similarly provided with circular openings 230 for the same purpose.

As motor shaft 16 rotates, each of gears 222, 261 will undergo a combined oscillatory and reciprocally translatory motion so as to roll with respect to the semi-circular arcuate portion of chain 241 with the gear teeth 224, 263 progressively engaging the spaces 242 of chain 241 to drive the latter. Due to the 180° phase difference between eccentric disks 219, 260 gear 222 will engage chain 241 during one half-cycle of rotation of motor shaft 16 and the other gear 261 will engage chain 241 for the other half-cycle of rotation of motor shaft 16. Chain 241 will thus be advanced a distance of one tooth space for each rotation of motor shaft 16 if the difference between the number of teeth (or spaces) of chain 241 present in a length thereof equivalent to its pitch circumference and the number of gear teeth 224, 263 is one, and chain 241 will be advanced a distance of two tooth spaces if said difference is two.

Chain 241 may be of any conventional or other suitable construction and is disclosed for purposes of illustration as comprising a first series of links 244 each having at its opposite ends an opening receiving a sleeve 245 mounted on one end of a pin 246 having at its opposite end sleeve 247 receive within an opening formed in the ends of a second series of links 248 extending parallel to said first series 244. A third series of links 249 is provided at its opposite ends with openings receiving the respective sleeves 245. However, said third series 249 is staggered with respect to the series 244. Similarly, a fourth series of links 250 is staggered with respect to a second series 248 and is provided with openings at opposite ends receiving the respective sleeves 247. Heads 252 are fixedly secured at opposite ends of pins 246 by screws 253. Rollers 251 at opposite ends of each pin 246 are rotatable thereon to reduce friction by rolling along the peripheral edges of housing plates 226, 227. Alternatively, chain 241 may drive a pulley 280 as shown in FIG. 10. For this purpose, heads 252 may be conical so as to match the inclination of the side walls 281, 282 of the V-shaped groove formed by the two halves 283, 284 of pulley 280.

There are thus disclosed several embodiments of the invention wherein a high transmission ratio is provided in a speed reduction drive mechanism which is nevertheless compact, economical in manufacture, and reliable and durable in operation.

It is to be understood that the specific embodiments of the invention shown in the drawings and described in detail above are merely illustrative of several of the many forms which the invention may take in practice without departing from the scope thereof as delineated in the appended claims and that the claims are to be construed as broadly as permitted by the prior art.

I claim:

1. A speed reduction drive mechanism comprising a stationary support, a motor, a member rotatable on said support about the axis of rotation of said motor, means for drivingly connecting said member to said motor, a circular eccentric disk fixed to said member and eccentrically located with respect to said axis, a gear having teeth at the periphery thereof and having a circular central opening rotatably receiving said eccentric disk and having an elongated slot therethrough extending radially with respect to said axis, pin means secured to said support and slidably extending into said slot, a continuous curvilinear driven element extending around said gear and having a series of spaced openings therethrough for receiving said teeth, the number of teeth in the gear being different than the number of openings in said element, whereby rotation of said member will cause combined oscillatory and reciprocal translatory motion of said gear to provide progressive interengagement of said teeth with said openings and thereby drivingly rotate said element, and power take-off means drivingly connected to said element.

2. A mechanism as recited in claim 1 wherein said support comprises a pair of mutually spaced parallel plates, means for mounting one of said plates to a motor housing, and means for securing the other plate to said one plate, said eccentric disk and said gear being located between said plates so as to be housed by the latter, said means drivingly connecting said member to said motor including a motor shaft for said motor, said plates having aligned openings therethrough for receiving a motor shaft.

3. A mechanism as recited in claim 1 wherein said power take-off means comprises a pulley secured to said driven element, and a belt in driving engagement with said pulley, and wherein said member comprises a sleeve adapted to be mounted on said motor shaft and said motor shaft extending through said sleeve.

4. A speed reduction drive mechanism comprising a stationary support, a member rotatable about an axis of rotation, means for drivingly connecting said member to a motor, a circular eccentric disk fixed to said member and eccentrically located with respect to said axis, a gear having teeth at the periphery thereof and having a circular central opening receiving said eccentric disk and having an elongated slot therethrough extending radially with respect to said axis, pin means secured to said support and extending into said slot, and a continuous curvilinear driven element extending around at least approximately half the periphery of said gear and having a series of spaced openings therethrough for drivingly engaging said teeth.

5. A mechanism as recited in claim 4 wherein said driven element comprises a cylindrical wall surrounding said gear, said wall having said series of openings therethrough.

6. A mechanism as recited in claim 5 and comprising a pulley secured to said cylindrical wall, a belt in driving engagement with said pulley, said support comprising a pair of mutually spaced parallel plates, means for mounting one of said plates to a motor housing, and means for securing the other plate to said one plate, said eccentric disk and said gear being located between said plates so as to be housed by the latter, said plates having aligned openings therethrough for receiving a motor shaft.

7. A mechanism as recited in claim 4 and comprising a second circular eccentric disk fixed to said member and being eccentrically offset with respect to said axis in a direction opposite to that of said first-recited disk, and a second gear having teeth around at least approximately half the periphery thereof and having a circular central opening receiving said second eccentric disk and having a second elongated slot therethrough receiving said pin means, whereby the teeth of said first gear progressively engage said driven element openings during one-half of each cycle of rotation of said member and the teeth of said second gear progressively engage said driven element openings during the other half of each cycle of rotation of said member.

8. A mechanism as recited in claim 7 wherein said driven element comprises a flexible tape.

9. A mechanism as recited in claim 7 wherein said driven element comprises a flexible chain.

10. A speed reduction drive mechanism comprising a stationary support, a member rotatable about an axis of rotation, a gear having teeth at the periphery thereof, means mounting said gear for combined oscillatory and reciprocating translatory movement with respect to said support, means drivingly connecting said member and said gear for oscillating and reciprocally translating the gear in response to rotation of said member, an annular element having a cylindrical wall surrounding said gear, said wall having a series of spaced openings therethrough for receiving said teeth, whereby rotation of said member will cause combined oscillatory and reciprocal translatory motion of said gear to provide progressive interengagement of said teeth with said openings and thereby drivingly rotate said element, and power take-off means drivingly connected to said element.

11. A mechanism as recited in claim 10 wherein said power take-off means comprises a pulley secured to said annular element, and a belt in driving engagement with said pulley, and wherein said member comprises a sleeve adapted to be mounted on a motor shaft extending therethrough.

12. A speed reduction drive mechanism comprising a stationary support, a member rotatable about an axis of rotation, a gear having teeth at the periphery thereof, means mounting said gear for combined oscillatory and reciprocating translatory movement with respect to said support, means drivingly connecting said member and said gear for simultaneously oscillating and reciprocally translating the gear in response to rotation of said member, and a continuous curvilinear driven element extending around at least approximately half the periphery of said gear and having a series of spaced openings therethrough for drivingly engaging said teeth.

13. A mechanism as recited in claim 12 wherein said driven element comprises a cylindrical wall surrounding said gear, said wall having said series of openings therethrough and extending therearound.

14. A mechanism as recited in claim 12 and comprising a second gear having teeth at the periphery thereof, means mounting said second gear for combined oscillatory and reciprocating translatory movement with respect to the support, means drivingly connecting said member and said second gear for simultaneously oscillating and reciprocally translating the second gear in response to rotation of said member, whereby the teeth of said first gear progressively engage said driven element openings during one-half of each cycle of rotation of said member and the teeth of said second gear progressively engage said driven element openings during the other half of each cycle of rotation of said member.

15. A mechanism as recited in claim 14 wherein said driven element comprises a flexible tape.

16. A mechanism recited in claim 14 wherein said driven element comprises a flexible chain.

References Cited by the Examiner

UNITED STATES PATENTS

| 128,352 | 6/77 | Andrews | 74—805 |
| 3,145,585 | 8/64 | Brown | 74—805 |

FOREIGN PATENTS 824,705   8/47   France.

DON A. WAITE, *Primary Examiner.*